Jan. 13, 1953 A. P. WIANCO 2,624,904
WINDSHIELD WIPER
Filed Jan. 25, 1949 3 Sheets-Sheet 1
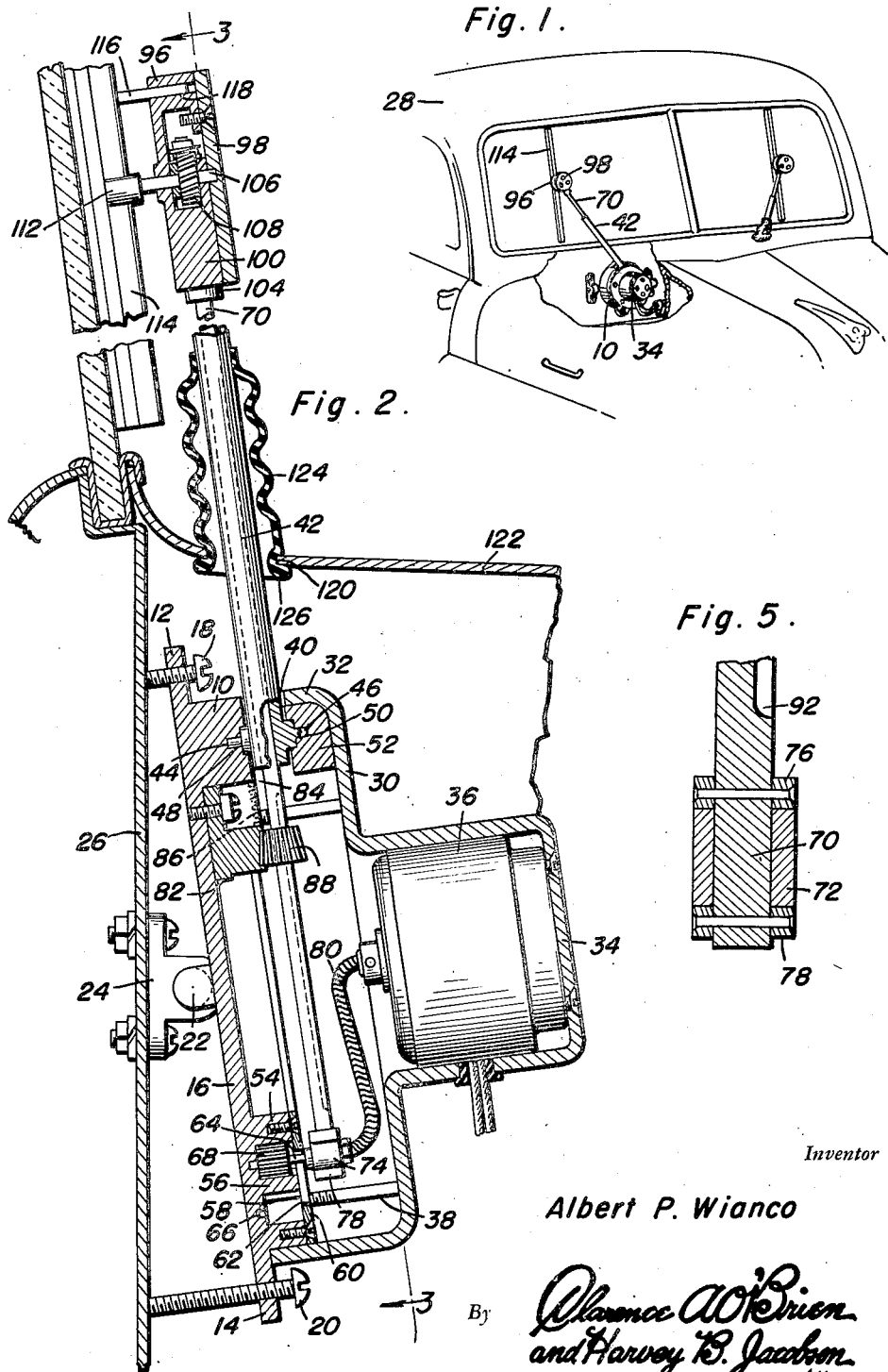
Inventor
Albert P. Wianco Jan. 13, 1953     A. P. WIANCO     2,624,904
WINDSHIELD WIPER
Filed Jan. 25, 1949     3 Sheets-Sheet 2
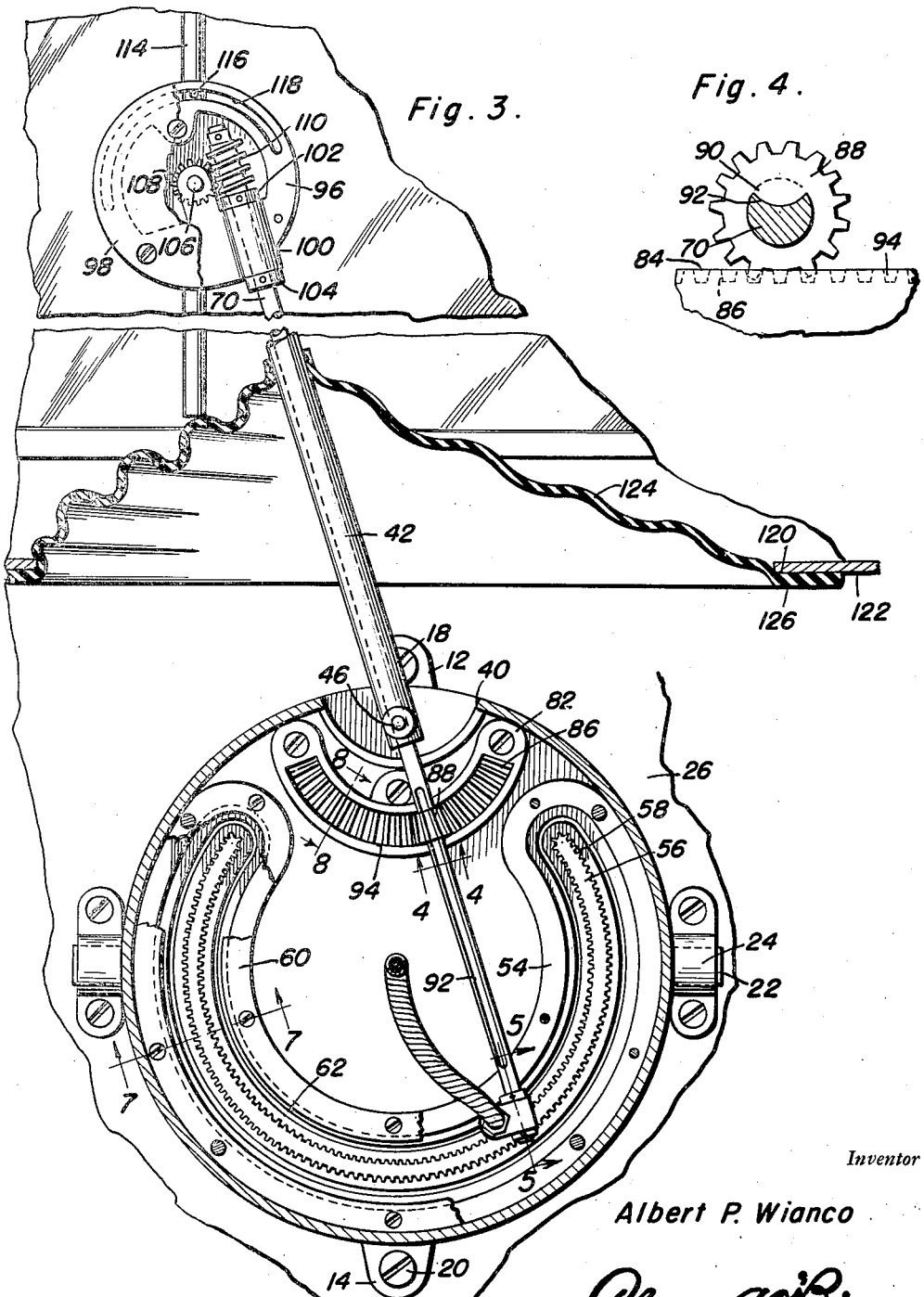
Inventor
Albert P. Wianco

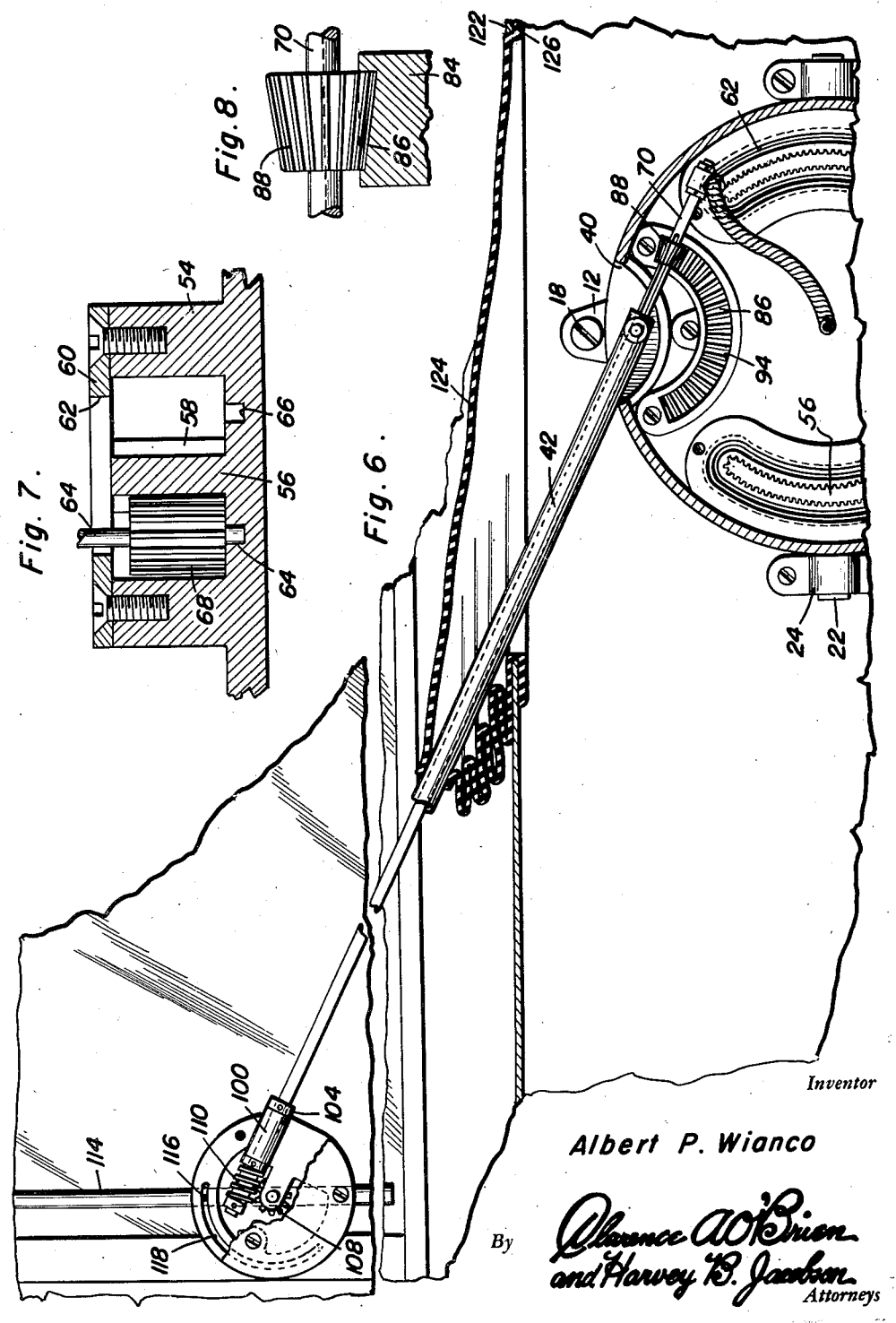

Patented Jan. 13, 1953

2,624,904

UNITED STATES PATENT OFFICE 2,624,904

WINDSHIELD WIPER

Albert P. Wianco, Florence, Colo.

Application January 25, 1949, Serial No. 72,588

8 Claims. (Cl. 15—253)

This invention relates to new and useful improvements in windshield wipers and the primary object of the present invention is to provide a windshield wiper including a wiping element and embodying novel and improved means for oscillating the wiping element and for retaining the wiping element in a straight substantially vertical position throughout its oscillating movement so that a large substantially rectangular area or zone of the windshield will be wiped thus providing a safe and convenient field of vision for the occupants of the vehicle.

Another important object of the present invention is to provide a windshield wiper including an oscillating member, a wiping element operatively connected to said oscillating member for swinging movement therewith, and means for rotating the oscillating member, during the swinging thereof, and urging said wiping element to a substantially vertical position through the swinging movement of said member.

A further object of the present invention is to provide a windshield wiper including a wiping element and means for selectively adjusting the wiping element to urge the said element, uniformly throughout its length, against the outer surface of a windshield.

A still further aim of the present invention is to provide a windshield wiper that is simple and practical in construction, strong and reliable in use, small and compact in structure, neat and attractive in appearance, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a vehicle and showing the present invention applied thereto, and with parts of the vehicle broken away for the convenience of explanation;

Figure 2 is a fragmentary side elevational view of a vehicle and showing the present wiper construction applied thereto, partly in section and partly in elevation;

Figure 3 is a longitudinal sectional view taken substantially on the plane of section line 3—3 of Figure 2 and showing the drive gear in its downward position on the upper toothed edge of the rack bar;

Figure 4 is an enlarged transverse sectional view taken substantially on the plane of section line 4—4 of Figure 3;

Figure 5 is an enlarged fragmentary longitudinal sectional view taken substantially on the plane of section line 5—5 of Figure 3;

Figure 6 is a view similar to Figure 3 and showing the drive gear in its upper position about to engage the upper toothed edge of the rack bar from the lower toothed edge of the rack bar;

Figure 7 is an enlarged sectional view taken substantially on the plane of section line 7—7 of Figure 3; and, Figure 8 is an enlarged sectional view taken substantially on the plane of section line 8—8 of Figure 3.

Referring now to the drawings in detail, wherein for the purpose of illustration, there is disclosed a preferred embodiment of the present invention, the numeral 10 represents a cup-like housing having upper and lower attaching ears 12 and 14 projecting outwardly from the inner wall 16 thereof and which receivably engage upper and lower adjusting screws or bolts 18 and 20 for a purpose which will later be more fully apparent.

Projecting outwardly from diametrically opposite sides of the housing 10 and suitably secured to the inner wall 16, is a pair of trunnions or pivot lugs 22 that are journaled for rotation in sockets or bearings 24 which are removably secured to the forward wall 26 of a vehicle 28.

The housing 10 is provided with a closure or removable outer wall 30 having an annular flanged portion 32 and a hollow, central projection 34 in which there is detachably mounted a preferably electric motor 36 that is connected to the circuit system of the vehicle. Obviously, this motor could be of the hydraulic type whereby the same would be operated by the power plant of the vehicle.

The closure 30 is removably secured to the housing 10 by any suitable number of fasteners 38 that extend through the closure and which receivably engage suitable apertures provided in the inner wall 16.

The upper portion of the housing 10 and the flanged portion 32 of the closure 30 are provided with communicating openings 40 that receive the lower end of a tubular member or bearing 42. A pair of diametrically opposed trunnions 44 and 46 project laterally from the lower end of the bearing 42 and are received in recesses 48 and 50 provided in the housing 10 and a block 52 carried by the closure 30 for swinging movement of the bearing 42 relative to the housing. It should be noted, that by removing the closure 30, the block 52 will also be removed permitting the bearing 42 to be disengaged from the housing 10.

Preferably integrally formed with the inner face of the inner wall 16, is an arcuate channel shaped member 54 between the legs of which there is provided an arcuate rack bar 56 also integrally formed with the inner wall 16. The rack bar 56 is provided with a continuous series of external teeth 58 that are spaced from the inner periphery of the arcuate channel shaped member 54.

An arcuate retainer plate 60 is removably secured to the leg portions of arcuate, channel shaped member 54 and includes an arcuate slot 62 that receives the outer end of a drive shaft 64. The inner end of the shaft 64 is slidably received in an arcuate, continuous guide groove 66 provided in the web of the arcuate, channel shaped member 54.

Keyed on or suitably secured to the drive shaft 64 is a drive gear 68 that is mounted in the channel member 54 to follow the continuous series of teeth 58 provided on the rack bar 56, it being understood that the plate 60 will prevent disengagement of the gear 68 from the teeth 58.

Slidably received in bearing 42 and journaled for rotation in the bearing 42, is a main shaft or operating arm 70 the lower end of which is journaled for rotation in a socket or sleeve 72 forming an integral part of a casing 74. Upper and lower collars 76 and 78, suitably fixed to the shaft 70 limit movement of the shaft 70 relative to the socket 72 in both directions.

The casing 74 receives a flexible drive shaft 80 from the motor 36 and the flexible drive shaft 80 is suitably coupled to the drive shaft 64 for rotating the latter and the gear 68 mounted thereon.

Removably secured to the inner wall 16, is the base portion 82 of an arcuate gear plate 84 having radially extending, arcuately disposed recessed teeth 86 that are intermeshed with the teeth of a beveled gear 88.

The inner periphery of the beveled gear 88 is provided with a convexed rib 90 that is slidably received in a longitudinally extending concaved recess or groove 92 provided in the shaft 70, and the beveled gear 88 is retained in position to the gear plate 84 since the minor and major ends of the beveled gear 88 bear against the inner faces 94 of the gear plate, without binding thereagainst.

The numeral 96 represents the wiping element support that is used in conjunction with the present invention and which includes a removable outer wall 98. This support 96 is provided with a sleeve portion or rigid bearing 100, beneath the outer wall 98, that receives the shaft 70, adjacent the upper end thereof.

Upper and lower stop collars 102 and 104 suitably mounted on the shaft 70 prevent sliding movement of the shaft 70 relative to the bearing 100 and support 96.

Journaled for rotation in support 96, and disposed perpendicular to and spaced from the shaft 70, is a driven shaft 106 that supports a driven gear 108 which is inter-meshed with a worm gear 110 mounted on the upper end of the shaft 70. One end of the driven shaft 106 projects outwardly from the support 96 and is suitably fixed in a socket 112 provided in the central portion of an elongated wiping element or wiper 114.

A lug or guide arm 116 fixed to the wiping element 114, adjacent the socket 112, is slidably received in an arcuate slot 118 provided in the support 96 and will engage the end edges defining the slot 118 to limit pivotal movement of the wiping element relative to the support 96.

In order to prevent water or the like from passing through the opening 120, provided in the hood 122 that receives the bearing 42, and into the housing 10 through opening 40, there is provided a resilient and expansible sleeve 124 having a lower flange 126 that bears against the inner face of the hood 122 and an open upper end that yieldingly embraces the bearing 42.

In practical use of the present invention, as the gear 68 is driven by the flexible shaft 80 and motor 36, the gear 68 will follow the continuous series of teeth 58 first moving from left to right on the lower group of teeth 58 and then from right to left on the upper group of teeth 58, as shown in Figure 3, to impart a swinging movement or oscillatory movement to the shaft 70 and hence the bearing 42.

Obviously, as the shaft 70 swings back and forth, due to the gear 68 following the teeth 58, the shaft 70 will also slide in the bearing 42, however, the gear 88 will always remain in contact with the teeth 86 of the gear plate 84 since the said beveled gear 88 is slidably received on the shaft 70 and retained as previously described relative to the gear plate 84.

As the shaft 70 is swung from left to right, as shown in Figure 3, the gear 88 engaging the teeth 86 will impart a rotation to the shaft 70 in one direction and as the shaft 70 is swung from right to left, as shown in Figure 3, the gear 88 will impart a rotation to the shaft 70 in an opposite direction than when the shaft is swung from left to right.

Since the support 96 is mounted relative to the shaft 70, the same will move with the shaft 70 relative to the bearing 42 and will likewise swing with the shaft 70.

During the rotation of the shaft 70, the worm 110 will also be rotated and will likewise rotate the gear 108 and the wiping element 114 will oscillate, it being understood that the worm 110 will rotate in one direction as the gear 88 moves from right to left on the gear plate 84, thus retaining the wiping element in a substantially vertical position throughout the swinging movement of the shaft 70 in both directions.

Having described the invention, what is claimed as new is:

1. A windshield wiper comprising a housing, a bearing pivoted to said housing for swinging movement, a shaft journaled for rotation in said bearing and swingable with said bearing, means for swinging the bearing, means for rotating said shaft, a wiper support journaled on said shaft and swingable therewith, a wiper pivoted to said support, and means forming a connection between the shaft and the wiper for swinging said wiper opposite to the swinging movement of said bearing during swinging movement of the bearing, said means for swinging said bearing including a driven gear carried by said shaft, and an arcuate rack bar having a continuous series of external teeth receiving said driven gear.

2. The combination of claim 1 wherein said means for rotating said shaft includes a gear slidably and non-rotatably carried by said shaft, and an arcuate gear plate mounted in said housing engaging said gear.

3. A windshield wiper comprising a housing, a bearing pivoted at one end to said housing for swinging movement, a shaft journaled for rotation in said bearing and slidably received in said bearing, means for imparting a swinging movement to said shaft and said bearing about the pivot of said bearing and a longitudinal sliding movement to said shaft within said bearing, means responsive to the swinging movement of said shaft for imparting rotation to said shaft, a support having a bearing receiving said shaft, means retaining said support on said shaft for sliding of the support and the bearing as a unit, a cleaning member pivoted to said support, and a driving connection between said shaft and said cleaning member, and means limiting pivotal movement of said cleaning member relative to said support, said means for imparting a swinging movement and sliding movement to said shaft including an arcuate rack bar having an externally toothed, continuous surface, and a driven gear carried by said shaft engaging the toothed surface of said rack bar.

4. A windshield wiper comprising a housing, a bearing pivoted in one end to said housing for swinging movement, a shaft journaled for rotation in said bearing and slidably received in said bearing, means for imparting a swinging movement to said shaft and said bearing about the pivot of said bearing and a longitudinal sliding movement to said shaft within said bearing, means responsive to the swinging movement of said shaft for imparting rotation to said shaft, a support having a bearing receiving said shaft, means retaining said support on said shaft for sliding of the support and the shaft as a unit, a cleaning member pivoted to said support, a driving connection between said shaft and said cleaning member, and means limiting pivotal movement of said cleaning member relative to said support, said means for imparting rotation to said shaft including an arcuate plate fixed in said housing and having circumferentially spaced radially disposed teeth thereon, a beveled gear slidably and non-rotatably received on said shaft and engaging the teeth on said arcuate plate, and means retaining said beveled gear relative to said arcuate plate.

5. A windshield wiper comprising a housing, a bearing pivoted at one end to said housing for swinging movement, a shaft journaled for rotation in said bearing and slidably received in said bearing, means for imparting a swinging movement to said shaft and the bearing about the pivot for the bearing and for sliding the shaft longitudinally within the bearing, means responsive to the swinging movement of said shaft for imparting rotation to said shaft, a support having a bearing receiving said shaft, means retaining said support on said shaft for sliding movement of the support and the shaft as a unit, a cleaning member pivoted to said support, a driving connection between said shaft and said cleaning member, said support including an arcuate slot lying on a circle concentric with the pivot for the cleaning member, and a pin carried by said cleaning member slidably received in said slot and guiding pivotal movement of said cleaning member about its pivot, the end walls of said slot adapted to engage with the pin to limit pivotal movement of said cleaning member about its pivot.

6. A windshield wiper comprising a housing, a bearing pivoted at one end to said housing for swinging movement, a shaft journaled for rotation in said bearing and slidably received in said bearing, means for imparting a swinging movement to said shaft and said bearing about the pivot of said bearing, means responsive to the swinging movement of said shaft for imparting rotation to said shaft, a support having a bearing receiving said shaft, means retaining said support on said shaft for sliding of the support and the shaft as a unit, a cleaning member pivoted to said support, a driving connection between said shaft and said cleaning member, said support including an arcuate slot lying on a circle concentric with the pivot for the cleaning member, a pin carried by said cleaning member slidably received in said slot and guiding pivotal movement of said cleaning member about its pivot, the end walls of said slot adapted to engage the pin to limit pivotal movement of said cleaning member about its pivot, said driving connection including a worm mounted on said shaft, a driven shaft carried by said support and connected to said cleaning member, and a driven gear mounted on said driven shaft and engaging the worm.

7. A windshield wiper comprising a housing, a bearing pivoted to the housing for swinging movement, a shaft slidably received in the bearing and journaled for rotation in the bearing, means for imparting a swinging movement to the bearing and for imparting longitudinal sliding movement to the shaft in the bearing, means responsive to the swinging movement of the shaft for imparting rotation to the shaft, a support rotatably receiving the shaft and mounted on the shaft for swinging movement therewith, a cleaning member rotatably supported by the support, a drive connection between the shaft and the cleaning member, and a pair of coaxial trunnions on said housing, a pair of bearings rotatably supporting the trunnions, and a pair of adjusting bolts carried by the housing and adapted to engage a structural member on which said pair of bearings are mounted to retain the housing in an inclined position and against pivotal movement relative to said pair of bearings.

8. A windshield wiper comprising a housing, means rockably supporting the housing, adjusting means carried by the housing restricting rocking of the housing, an elongated bearing pivoted at one end to the housing for swinging movement, a shaft slidable longitudinally within the bearing and including an inner end entering the housing, a power driven gear carried by the inner end of said shaft, an arcuate rack bar within said housing and having an externally toothed, continuous surface engaged by said gear, a gear slidably and non-rotatably mounted on the inner end of said shaft, an arcuate plate mounted in said housing and having circumferentially spaced radially disposed teeth thereon meshing with the last mentioned gear to impart rotation to the shaft during swinging of the shaft as the power driven gear follows the rack bar, a wiper support journaled on the outer end of said shaft and movable with the shaft, a wiper pivoted to the support, and means forming a connection between said shaft and said wiper for swinging said wiper opposite to the swinging movement of said bearing as the power driven gear follows the rack bar.

ALBERT P. WIANCO.

REFERENCES CITED

The following references are of record in the file of this patent:

UNITED STATES PATENTS

| Number | Name | Date |
|---|---|---|
| 1,660,971 | Lindner | Feb. 28, 1928 |
| 1,739,896 | Garbell | Dec. 17, 1929 |
| 1,866,700 | Farmer | July 12, 1932 |
| 1,964,109 | Cusset | June 26, 1934 |
| 2,079,399 | Drew | May 4, 1937 |
| 2,181,066 | Rau | Nov. 21, 1939 |
| 2,185,572 | Sawyer | Jan. 2, 1940 |
| 2,324,894 | Whitted | July 20, 1943 |